United States Patent [19]
Ito

[11] 3,717,026
[45] Feb. 20, 1973

[54] VISCOSIMETER
[75] Inventor: Koshiro Ito, Tokyo, Japan
[73] Assignee: Kabushikikaisha Tokyo Keiki, Tokyo, Japan
[22] Filed: Feb. 16, 1971
[21] Appl. No.: 115,234

[30] Foreign Application Priority Data

Feb. 24, 1970   Japan ..............................45/17559
Sept. 17, 1970  Japan ..............................45/92152
Dec. 18, 1970   Japan ..............................45/128131

[52] U.S. Cl. ....................................................73/57
[51] Int. Cl. ..............................................G01n 11/12
[58] Field of Search ................................73/57, 209

[56] References Cited

UNITED STATES PATENTS 2,955,459  10/1960  Cihelka et al. ...........................73/57
3,128,625  4/1964   Heineman ...............................73/209

FOREIGN PATENTS OR APPLICATIONS 1,365,835  5/1964  France ...................................73/57
  158,143  6/1962  U.S.S.R. .................................73/57

Primary Examiner—S. Clement Swisher
Assistant Examiner—Joseph W. Roskos
Attorney—Hill, Sherman, Meroni, Gross & Simpson

[57] ABSTRACT

A viscosimeter having a tube for permitting the passage therethrough of a liquid to be measured, a falling slug disposed in the tube in a manner to be movable in its axial direction, a detecting coil mounted on the outside of the tube, a measuring circuit supplied with the output from the detecting coil, a valve mounted in the tube for controlling the flow of the liquid in the tube and a programmer for controlling the measuring circuit. In this case, the tube is made of a non-ferromagnetic material, one end of which is connected with a pipe through which the liquid flows, and the measuring circuit includes a waveform converter circuit for converting the output from the detecting coil and a time measuring and indicating circuit for measurement and indication with the output of the waveform converter circuit.

7 Claims, 19 Drawing Figures

INVENTOR.
Koshiro Ito

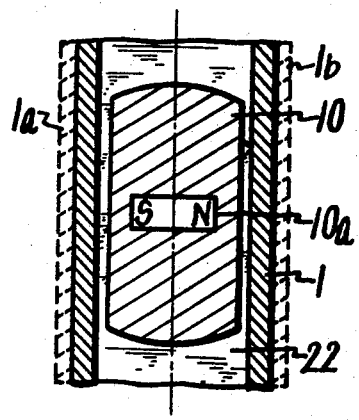
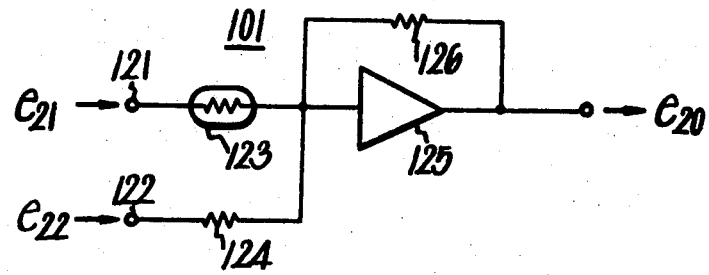
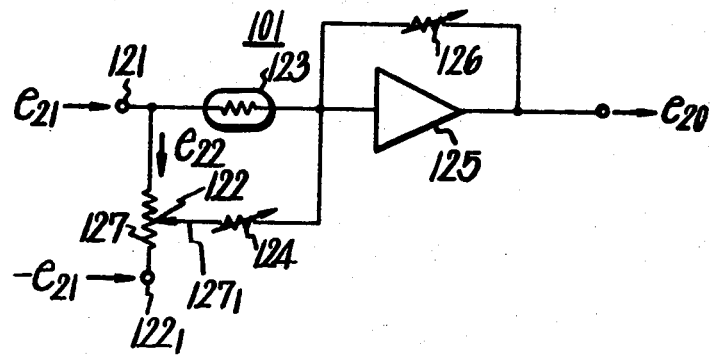

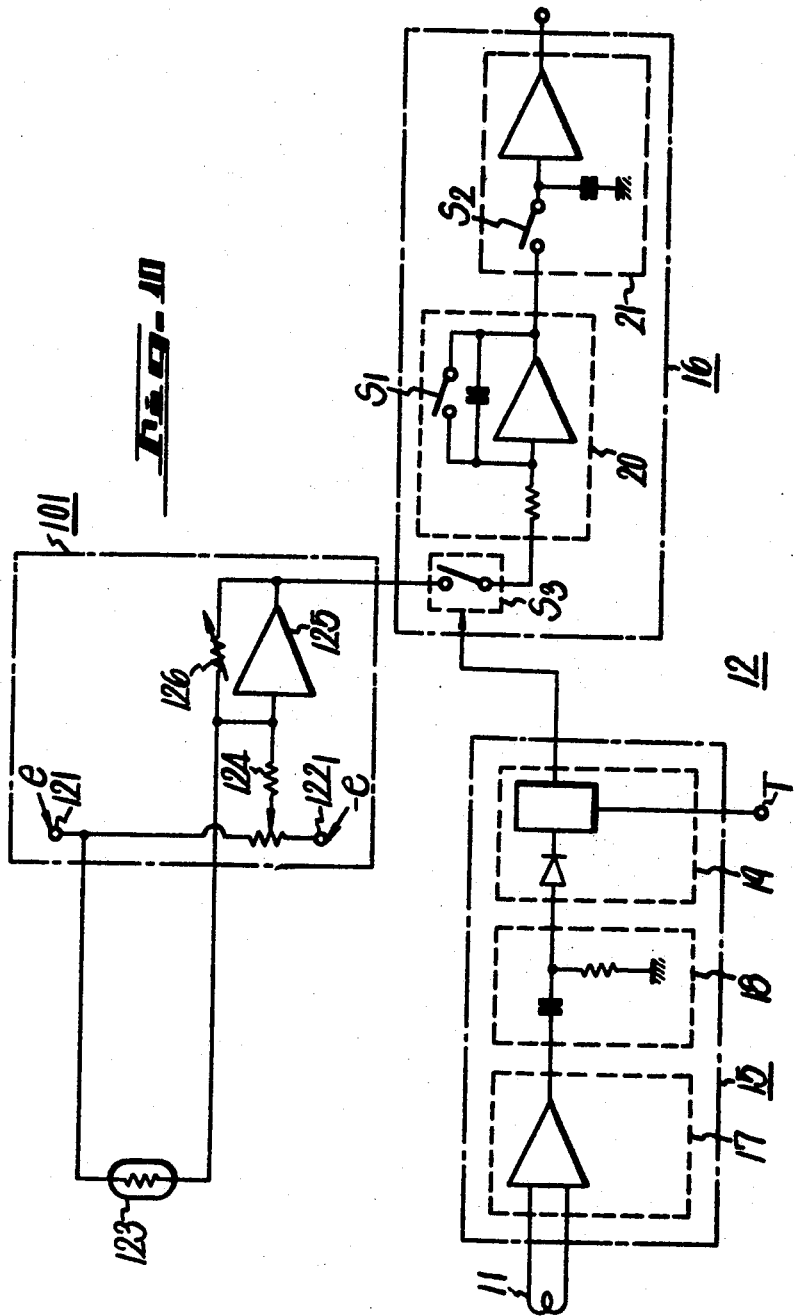

VISCOSIMETER

BACKGROUND OF THE INVENTION

1. Field of the Invention

This invention relates to a viscosimeter which is of particular utility when employed in measurement of the viscosity of liquids.

2. Description of the Prior Art

In general, the viscosity of a liquid is measured by detecting a restrictive force imparted by the liquid to an external force supply means when the external force supply means has been frictionally associated with the liquid to be measured, for example, immersed therein. Conventional viscosimeters for measuring the viscosity of liquids, especially on-line viscosimeters, are continuous measuring type and falling slug type. However, the continuous measuring type viscosimeter is very complicated in construction and poor in producing accurate results and the falling slug type viscosimeter is inconvenient for use in an on-line system due to its falling-type nature.

SUMMARY OF THE INVENTION

The principal object of this invention is to provide a viscosimeter which is free from the aforementioned defects experienced in the prior art.

Another object of this invention is to provide a viscosimeter which is simple in construction, excellent in reproducibility, easy to use, fewer errors in measurement and suitable for use in the on-line system.

BRIEF DESCRIPTION OF THE DRAWINGS

FIG. 7, is a schematic cross-sectional view of the principal part of one example of the falling slug used in this invention;

FIG. 8 is a connection diagram illustrating one example of a temperature compensation circuit for use in the present invention;

FIGS. 9 and 10 are connection diagrams, similar to FIG. 8, showing other examples of the temperature compensation circuit for use in the present invention.

DESCRIPTION OF THE PREFERRED EMBODIMENTS

Figure 1:
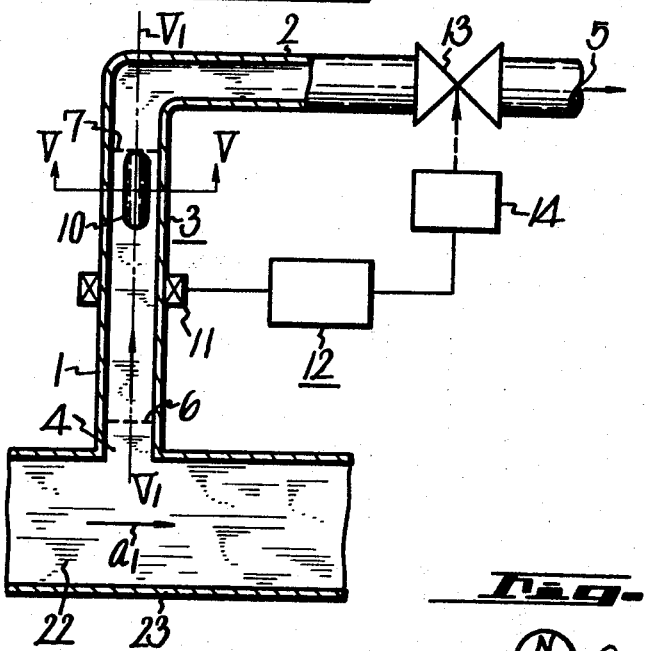
FIG. 1 is a schematic diagram showing one example of a viscosimeter of this invention.
Figure 2:
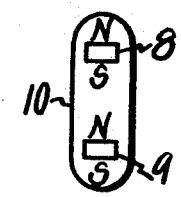
FIG. 2 is an enlarged schematic diagram illustrating one example of a falling slug used in the viscosimeter depicted in FIG. 1.
Figure 3:
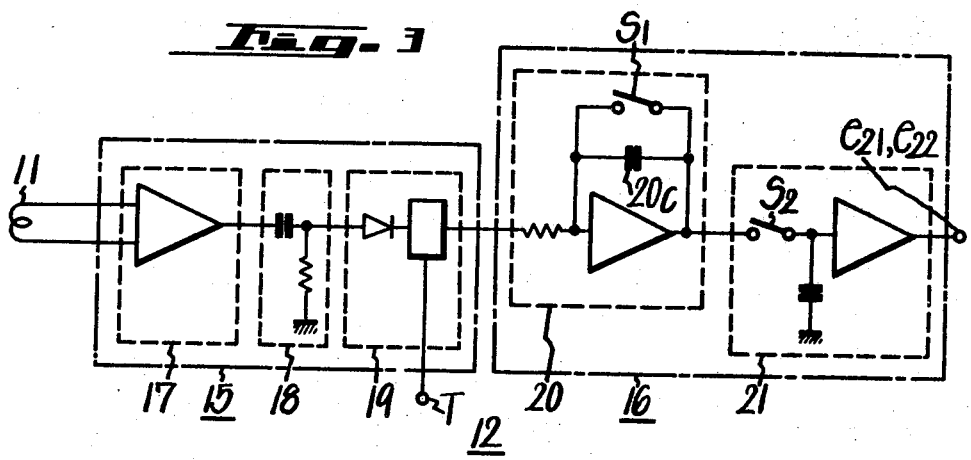
FIG. 3 is a block diagram showing one example of an electric circuit for use with the viscosimeter of FIG. 1.

A viscosimeter of the present invention is constructed as shown in FIGS. 1–3. The viscosimeter has an L-shaped tube 3 such as shown in FIG. 1 which is made of a non-ferromagnetic material such, for example, as glass or the like and includes a portion of larger diameter 1 and a portion 2 of smaller diameter. A fluid to be measured flows into portion 1 of tube 3 from supply tube 23. Fluid flows from portion 2 to an outlet 5. Inside of the larger portion 1 of the tube 3, a pair of mesh-like limit means 6 and 7 are stretched across the axis $V_1$—$V_1$ of the tube 3 at substantially right angles thereto and define a test distance. In the portion of portion 1 between the limit means 6 and 7, a falling slug 10 is contained and which has permanent magnets 8 and 9 each having north and south poles as shown in FIG. 2. Slug 10 is movable in the axial direction $V_1$—$V_1$ of the tube portion 1. The limit means or stoppers 6 and 7 are effective to limit the movement of the slug 10 in the axial direction $V_1$—$V_1$. A detecting coil 11 is mounted on the outer wall of the portion 1 between the limit means 6 and 7. The detecting coil 11 is connected to a measuring circuit 12. A valve 13 is provided in the smaller portion 2 of the tube 3. A programmer 14 is provided for controlling the valve 13 and the measuring circuit 12. The measuring circuit 12 is made up of a waveform converter circuit 15 and a time measuring and indicating circuit 16 as shown in FIG. 3. The waveform converter circuit 15 consists of a pre-amplifier circuit 17 connected to the output of the detecting coil 11. A differentiating circuit 18 receives the output of the pre-amplifier circuit 17 and a flip-flop circuit 19 receives the output of the differentiating circuit 18. The time measuring and indicating circuit 16 includes an integrator circuit 20 which is connected to the output of the flip-flop circuit 19 of the waveform converter circuit 15. A holding circuit 21 is connected to the output of the integrator circuit 20. The flip-flop circuit 19 is connected to a terminal T. The integrator circuit 20 has a switch $S_1$ connected in parallel to the integrating capacitor 20c. The holding circuit 21 has a switch $S_2$ connected in series with its input.

A description will be given of the operation of the viscosimeter. As depicted in FIG. 1, the portion 1 of the tube 3 is mounted substantially vertically and is coupled to a pipe 23 so that the fluid 22 passes into the inlet 4. The fluid or liquid 22 whose viscosity is to be measured flows in a direction shown by arrow $a_1$. The liquid 22 flowing in the pipe 23 flows into the tube 3 and flows through the enlarged portion 1, the reduced portion 2, the valve 3 and then out from the outlet 5. The liquid flowing from the outlet 5 may be returned to the system through a lower pressure line or may be discharged.

Figure 4:
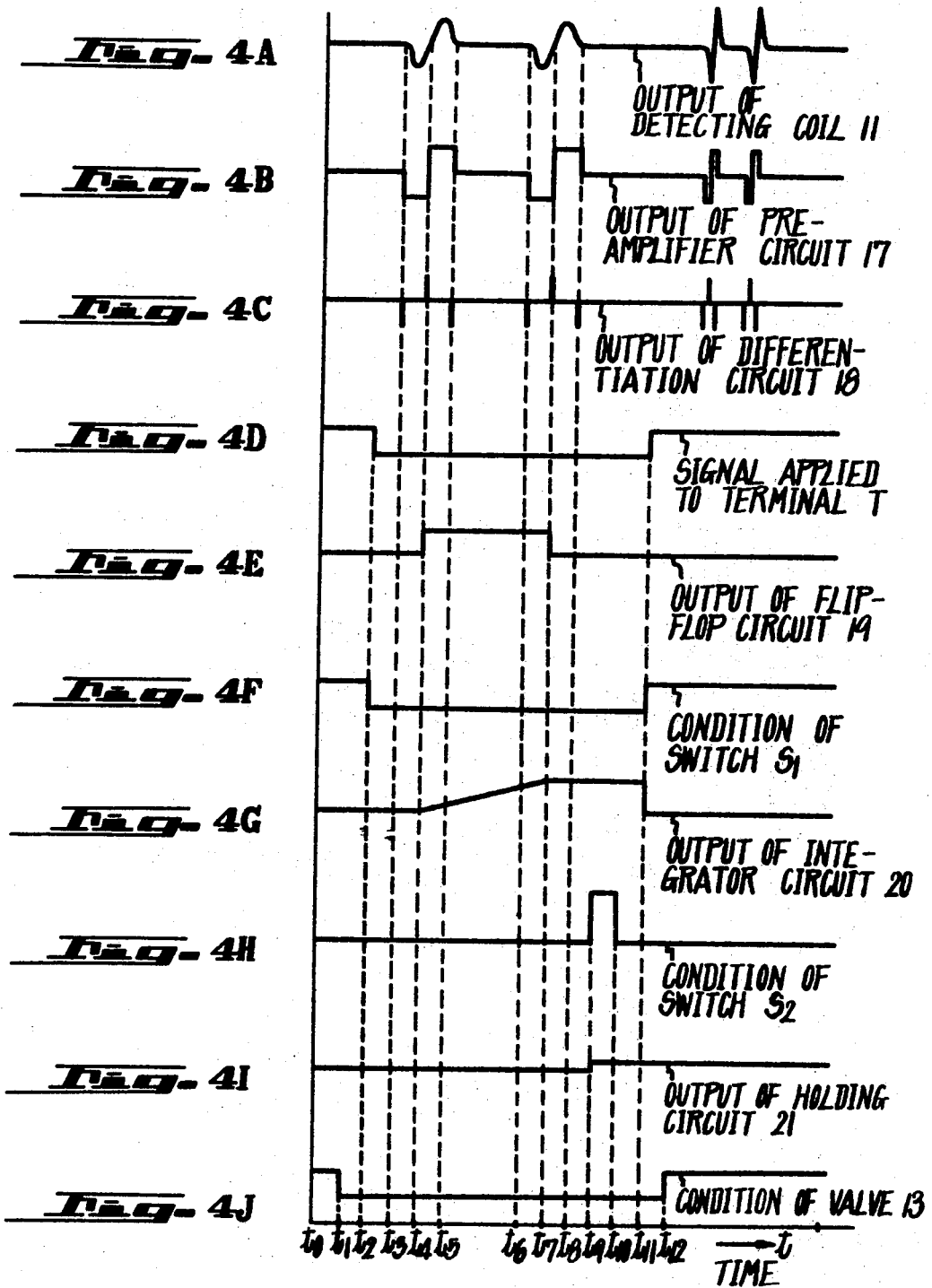
FIGS. 4A–4J are a series of waveforms produced at respective parts of the viscosimeter of FIG. 1, for explaining its operation.

Let it be assumed that the valve 13 is held open at a time $t_0$ when the liquid 22 flows through the tube 3. The curve of FIG. 4J indicates the condition of the valve which is opened during a high portion of the curve and closed during a low portion of the curve. Since the liquid 22 flows into the tube 3 from its inlet 4 and out the outlet 5, the slug 10 tends to be lifted relative to FIG. 1 and is moved into contact with the limit means or stopper 7 and stopped at that position. The valve 13 is closed at a time $t_1$ (refer to FIG. 4J) and the flow of liquid 22 stops. This causes the slug 10 to start to fall down in the tube portion 1. Its falling speed becomes constant in a short time and is determined by the viscosity of the liquid 22. Then, at a time $t_2$, a reset signal fed to the terminal T of the flip-flop circuit 19 is turned off as shown in FIG. 4D, and at the same time, the switch $S_1$ of the integrator circuit 20 is closed, as shown in FIG. 4F. The detecting coil 11 generates outputs at times $t_3-t_8$ (refer to FIG. 4A) when the permanent magnets 8 and 9 of the slug 10 pass through the detecting coil 11 while the slug 10 is falling in the portion 1 of the tube 3. The output of the detecting coil 11 is supplied to the pre-amplifier 17 of the waveform converter circuit 15 to derive at its output side an output such as depicted in FIG. 4B. This output is fed to the differentiating circuit 18 which derives therefrom the pulse waveform shown in FIG. 4C. This signal drives the flip-flop circuit 19 which produces an output such as shown in FIG. 4E between the times $t_4$ and $t_7$. The integrating circuit 20 integrates the output of the flip-flop circuit 19 to measure the time period $t_4$ to $t_7$. The output of the integrator circuit 20 increases at a constant rate with time and becomes constant after the time $t_7$ (refer to FIG. 4G). The switch $S_2$ of the holding circuit 21 is closed between times $t_9$ and $t_{10}$ (refer to FIG. 4H) during which time the output of the integrator circuit 20 is applied to the holding circuit 21 which produces an output representing a new value (refer to FIG. 4I).

When the reset signal is supplied to terminal T of the flip-flop circuit 19 and the switch $S_1$ of the integrator circuit 20 is closed at a time $t_{11}$ as depicted in FIGS. 4D and 4F, the output of the integrator circuit 20 will be reset to zero. When the valve 13 is opened at a time $t_{12}$ as shown in FIG. 4J, the liquid 22 starts to flow in tube 3 again. This causes the slug 10 to be lifted against the limit means 7 again. The output is held unchanged by the holding circuit 21 during this time. In this manner, the measurement of viscosity of the liquid is periodically achieved. The position of the slug 10 is controlled by the valve 13 and, at the same time, the liquid to be measured is periodically replaced.

In accordance with the present invention, the slug 10 is moved in the tube 3 which contains the liquid to be measured and an output is produced by the detecting coil 11 indicative of viscosity of the liquid. The viscosimeter of this invention is easy to use, simple in construction and inexpensive. The viscosimeter of this invention is very accurate and allows the results to be reproduced very quickly. The invention is particularly advantageous for online systems.

Although the time-measuring and indicating circuit 16 includes the integrator circuit 20 and the holding circuit 21 in the foregoing example, the same results can be obtained by employing as the time-measuring and indicating circuit 16, a counter circuit which is controlled by the waveform converter circuit 15.

Further, the foregoing example employs the slug 10 having incorporated therein the two permanent magnets 8 and 9 but it is also possible to omit either one of the permanent magnets and use two detecting coils. In addition, the same results as those described above can also be obtained even by the use of a slug provided with, for example, one or two magnetic members without using permanent magnets.

The slug 10 may be moved in the enlarged portion 1 of the tube 3 by suitably controlling the valve 13 without employing limiters or stoppers 6 and 7.

The present invention provides a viscosimeter which is simple in construction, excellent in reproducibility, easy to use and which provides accurate measurements and in which a falling slug is provided in a tube having mounted thereon a detecting coil. The slug is moved by a specimen passing through the tube, thereby to obtain a series of output signals in a sequential order.

Generally, the falling slug type viscosimeter is defective in that in the case of viscosity measurements of the same liquid held under substantially the same conditions, deviations or fluctuation is introduced in the measured values and this results in inaccurate measurements, as previously mentioned. This deviation is caused by different falling speeds of the slug 10 in the liquid 22 during the measurements. Various factors cause this but a main factor is the variations in the position of the slug 10 relative to the tube 3 (especially in its inner surface) during every measurement. This results from the fact that the inner shape of the tube 3 and the outer shape of the slug 10 are not perfectly symmetrical with respect to their respective axes.

Figure 5:
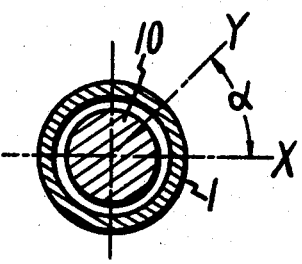
FIG. 5 is a cross-sectional view taken along the line V–V of FIG. 1.
Figure 6:
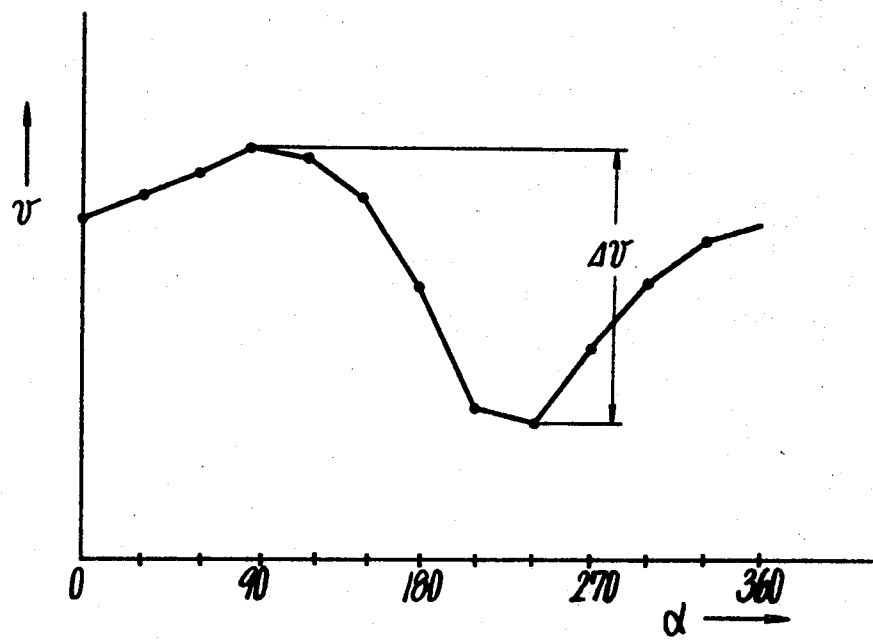
FIG. 6 is a graph showing the relationship between the falling speed of the falling slug and the relative angle of the falling slug of a conventional viscosimeter with respect to a tube.

Referring now to FIGS. 5 and 6, a description will be given of how the falling speed of the slug 10 in the liquid 22 varies with changes in the position of the slug 10 relative to the tube 3. A variation in the angle $\alpha$ (referred to as a relative angle $\alpha$) between a base line X of the polar coordinates of the enlarged portion 1 of the tube 3 and a base line Y of the polar coordinates of the slug 10 can be regarded as a change in the position of the slug 10 relative to the enlarged portion 1 of the tube 3. FIG. 6 shows variations in the falling speed $v$ of the of the slug 10 corresponding to various values of the relative angle $\alpha$, in which the ordinate represents the falling speed $v$ and the abscissa the relative angle $\alpha$. As will be seen from FIG. 6, the falling speed $v$ varies with the relative angle $\alpha$ within a range of $\Delta v$. It might be said that the deviations in the indication of the viscosimeter is caused by a change in the position of the slug 10 relative to the enlarged portion 1 of the tube 3. Referring to FIG. 7, a description will be given of one example of a viscosimeter which is free from the above defect and is designed to hold the position of the slug 10 substantially constant relative to the enlarged portion 1 of the tube 3. As shown in the figure, a bar-shaped permanent magnet 10a, having the north and south magnetic poles substantially perpendicular to the axial direction of the columnar slug 10, is embedded in the columnar slug 10.

When the slug 10 with the permanent magnet 10a is dropped through the liquid in the vertically mounted enlarged portion 10 of the tube 3, the permanent magnet 10a is affected by earth magnetism and held at a position substantially constant relative to the enlarged portion 1 of the tube 3. Consequently, the slug 10 is also retained at a position substantially constant relative to the enlarged portion 1 of the tube 3 while it falls. In other words, the relative angle $\alpha$ between the enlarged portion 1 and the slug 10, previously mentioned in connection with FIG. 5, is maintained substantially constant so long as the position of the enlarged portion 1 relative to the earth is constant. This prevents deviations such as occur in the conventional viscosimeters.

With the above arrangement, the slug is affected by earth magnetism while falling in the tube and this prevents a variation in the relative angle as it falls and provides for enhanced accuracy of measurement.

The foregoing example has been described in connection with the case where earth magnetism is used to impose an external magnetic restriction on the bar magnet in the slug but the same results can be obtained in a modification where a pair of bar magnets 1a and 1b are disposed on the outside of the enlarged portion 1 of the tube 3 and which extend in its axial direction and mounted in diametrically opposing relation to each other as indicated by broken lines in FIG. 7 so as to restrict the magnet in the slug and consequently the slug by the pair of bar magnets in addition to earth's magnetic field.

Also, when using permanent magnets on the outside of the tube, the same results as described above can be obtained by embedding in the slug a magnetic plate member of similar configuration in place of the permanent magnet 10a.

In addition, it will be understood that the cylindrical tube and the columnar slug may be respectively replaced with a tube and a slug of other configurations such as ones with elliptical cross-sections.

The foregoing example employs the bar magnet 10a but a magnetic member such as a magnetic disc magnetized in a manner similar to the bar magnet could be also used.

Further, the magnet 10a need not always be embedded in the slug 10 but may be mounted on the outside of the slug so long as it does not impede movement.

A description will hereinbelow be given of one example of a temperature compensating circuit for use with the viscosimeter of this invention.

Generally, it is preferred when measuring the liquid viscosity to hold the liquid at a constant temperature but it is very difficult to maintain the liquid at a constant temperature throughout the measurement. In practice, temperature compensation is generally required for temperature change.

When the temperature change of the liquid is in a narrow range, the relationship between the temperature and viscosity of the liquid is expressed by Andrade's equation (1):

$$\eta = Ae(K\eta/T) \quad (1)$$

where $\eta$ represents the liquid viscosity, $A$ and $K\eta$ are constants and $T$ is the absolute temperature. From the equation (1) the following equation is obtained:

$$(\delta\eta/\delta T) = -(K\eta/T^2) \cdot \eta \quad (2)$$

The relationship between the resistance value $R$ of a thermistor and the absolute temperature $T$ is given by the following equation:

$$R = Re^{K_R\left(\frac{1}{T}-\frac{1}{T_0}\right)} \quad (3)$$

where $K_R$, $T_0$ and $R_0$ are constants.

From the equation (3) the following equation is obtained:

$$(\delta R/\delta T) = -(K_R/T^2) \cdot R \quad (4)$$

With reference to FIG. 8, an example of a temperature compensation circuit for use with the viscosimeter of this invention is described. In the figure, reference numeral 101 indicates generally a temperature compensation circuit for the viscosimeter of this invention. Input terminals 121 and 122 of the circuit 101 receive the outputs of the viscosimeter which are the outputs $e_{21}$ and $e_{22}$ of the holding circuit 21 of the time measuring and indicating circuit 16 depicted, for example, in FIG. 3. A thermistor 123 is connected to the terminal 121 and has a resistance value $R$ which varies with the temperature of the liquid as above described and in which it is mounted. A reference resistor 124 is connected to the terminal 122. The thermistor 123 and the reference resistor 124 are connected at their other ends and are connected to the input side of an amplifier circuit 125. A feed-back resistor 126 is interposed between the input and output terminals of the amplifier circuit 125.

In the temperature compensation circuit 101 of the above construction, the output voltage $e_{20}$ based upon the foregoing equations (1) – (4) is:

$$e_{20} = -\left(\frac{e_{21}}{R} + \frac{e_{22}}{R_1}\right) R_2 \quad (5)$$

where $R$ is the resistance value of the thermistor 123 as set forth above, $R_1$ and $R_2$ the resistances of the reference resistor 124 and the feedback resistor 126, respectively, $e_{21}$ and $e_{22}$ the outputs of the viscosimeter as set forth above.

The temperature compensation circuit 101 is constructed to follow the following equation:

$$e_{22} = \frac{R_1}{R'}\left(\frac{K_R}{K\eta}-1\right)e_{21}$$

where $R'$ is the resistance value (a fixed value) (representing an intermediate value in the variation range of the resistance value $R$ of the thermistor 123 due to temperature change) and $K_R$ and $K\eta$ constants. Accordingly, the output $e_{20}$ of the circuit 101 is given by the following equation:

$$e_{20} = -\left\{\frac{1}{R} + \frac{1}{R'}\left(\frac{K_R}{K\eta}-1\right)\right\} R_2 \cdot e_{21} \quad (6)$$

If the input $e_{21}$ is a value corresponding to the viscosity of the liquid, it is expressed by the following equation:

$$e_{21} = \alpha \cdot \eta \quad (7)$$

The temperature characteristic of the output $e_{20}$ of the temperature compensation circuit 101 at this time is given by the following equation:

$$\frac{\partial e_{20}}{\partial T} = \frac{\partial}{\partial T}\left[-\alpha R_2 \cdot \eta\left\{\frac{1}{R}+\frac{1}{R'}\left(\frac{K_R}{K\eta}-1\right)\right\}\right]$$

$$= \alpha R_2\left[\frac{\partial \eta}{\partial T}\left\{\frac{1}{R}+\frac{1}{R'}\left(\frac{K_R}{K\eta}-1\right)\right\}\right.$$

$$\left.+\eta\frac{\partial}{\partial T}\left\{\frac{1}{R}+\frac{1}{R'}\left(\frac{K_R}{K\eta}-1\right)\right\}\right]$$

$$= -\alpha R_2\left[-\frac{K\eta}{T^2}\cdot\eta\left\{\frac{1}{R}+\frac{1}{R'}\left(\frac{K_R}{K\eta}-1\right)\right\}+\eta\frac{1}{R^2}\cdot\frac{K_R}{T^2}\cdot R\right]$$

$$= -\frac{\alpha R_2 \eta}{T^2}\left[-K\eta\left\{\frac{1}{R}+\frac{1}{R'}\left(\frac{K_R}{K\eta}-1\right)\right\}+\frac{K_R}{R}\right] \quad (8)$$

Substituting $R' = R$ into the equation (8), the following equation (9) is obtained:

$$\frac{\partial e_{20}}{\partial T} = \frac{\alpha R_2 \eta}{T^2}\left(-\frac{K_R}{R}+\frac{K_R}{R}\right) = 0 \quad (9)$$

It will be seen from the equation (9) that the temperature compensation circuit 101 achieves temperature compensation and that temperature change in its output $e_{20}$ is zero.

FIG. 9 illustrates a modified form of the temperature compensation circuit for use with the viscosimeter of this invention. In the figure, the same reference numerals and characters as those in FIG. 8 respectively designate the similar elements and their constructions and operations are substantially identical with the aforementioned ones and the detailed common description will not be repeated.

In the example of FIG. 9 the reference resistor 124 is formed variable and the input terminal 122 is used as a tap $127_1$ of a potentiometer 127 and is connected to one end of the variable reference resistor 124. In this case the resistance value $R_1$ (strictly speaking, the sum of the resistance value $R_1$ and that at the input side of the circuit 101) is rendered substantially equal to the resistance valve at the operation mid point of the thermistor 123. One end of the potentiometer 127 is connected to the input terminal 121 and the other end $122_1$ is supplied with an input $-e_{21}$.

The one input $e_{22}$ supplied to the resistor 124 of the circuit 101 is selected such that $$e_{22} = \left(\frac{K_R}{K\eta} - 1\right) e_{21}$$

in accordance with the temperature characteristic of the liquid. The feedback resistor 126 is also made variable and its resistance value $R_2$ is adjusted to control the range of the output $e_{20}$ in this example. For $K_R/K\eta$ in the foregoing equation, a condition $0 \leq K_R/K\eta \leq 2$ is established.

FIG. 10 shows another modification of the temperature compensation circuit applicable to the viscosimeter according to this invention. In the present example, a temperature compensation circuit 101 which is substantially identical in construction with that in FIG. 8 or 9, is connected to the input side of the time measuring and indicating circuit 16 of the circuit shown in FIG. 3. In this example, reference numerals corresponding to those in FIGS. 3, 8 and/or 9 indicate the corresponding elements. The terminals 121 and $122_1$ of the temperature compensation circuit 101 are supplied with input voltages from constant-voltage power sources $e$ and $-e$ to provide an output which is temperature-compensated. This output is applied to the integrator circuit 20 through the switch $S_3$ controlled by the output of the flip-flop circuit 19 and is integrated for a certain period of time, thereby deriving from the time measuring and indicating circuit 16 a temperature-compensated output corresponding to the actual viscosity of the liquid.

Since the circuit exemplified in FIG. 10 employs the constant-voltage power sources $e$ and $-e$, the output voltage may be of one kind. This simplifies the circuit construction of the temperature compensation circuit. Further, the final output representing the viscosity is produced as averaged with respect to temperature change (during measurement, for example, in the time interval from $t_4-t_7$ in FIG. 4). This reduces output variation in addition to the effect of temperature compensation.

As has been described in the foregoing, the temperature compensation circuit for use with the viscosimeter of this invention is extremely simple in construction, inexpensive, excellent in characteristics and reliable and accurate in operation.

It will be apparent that many modifications and variations may be effected without departing from the scope of the novel concepts of this invention.

I claim:

1. A viscosimeter comprising:
   a tube made of a non-ferromagnetic material and permitting the passage therethrough of a liquid to be measured;
   one end of the tube communicating with a pipe for the liquid to flow therein;
   a falling slug contained in the tube in a manner to be movable in its axial direction and mounted to move therethrough;
   a detecting coil means mounted on the outside of the tube;
   a measuring circuit including a waveform converter circuit consisting of a differentiating circuit and a flip-flop circuit, said differentiating circuit receiving an output from said detecting coil and producing a pulse signal which is supplied to said flip-flop circuit and a time measuring and indicating circuit receiving the output of said flip-flop circuit for the measurement and indication of time indicative of viscosity;
   a programmer means; and
   a valve mounted in the tube, said programmer means connected to said valve to open and close it to control the flow of the liquid in the tube and also connected to said measuring circuit to control it.

2. A viscosimeter as claimed in claim 1 which further includes a temperature compensation circuit connected between said waveform converter circuit and said time measuring and indicating circuit.

3. A viscosimeter as claimed in claim 1 which further includes a temperature compensation circuit connected to the output of said time measuring and holding circuit.

4. A viscosimeter as claimed in claim 1 wherein a pair of elongated magnetic members are mounted on opposite sides of said tube in that portion of the tube in which the falling slug moves and magnetic means mounted in the falling slug so as to hold the slug in a substantially constant angular relationship to said tube.

5. A viscosimeter as claimed in claim 1 wherein two separate magnetic members are mounted in said falling slug.

6. A viscosimeter as claimed in claim 1 wherein said detecting coil means consists of two coils spaced apart from each other in the axial direction on said tube and a single magnetic means mounted in said falling slug.

7. A viscosimeter as claimed in claim 1 wherein a pair of porous stoppers are mounted in said tube in spaced relationship to each other with the slug between them such that said stoppers limit the motion of said slug in said tube.

* * * * *